INVENTOR.
Courtney N. Mitchell

June 28, 1938.  C. N. MITCHELL  2,121,813
INTERNAL COMBUSTION ENGINE
Original Filed April 30, 1928   3 Sheets-Sheet 2
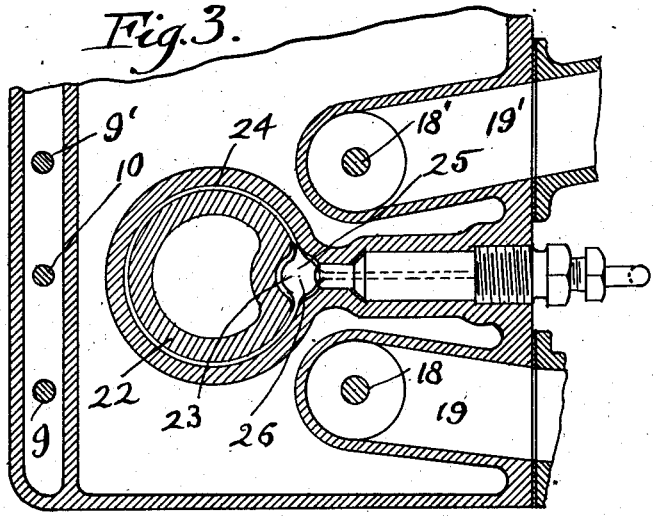
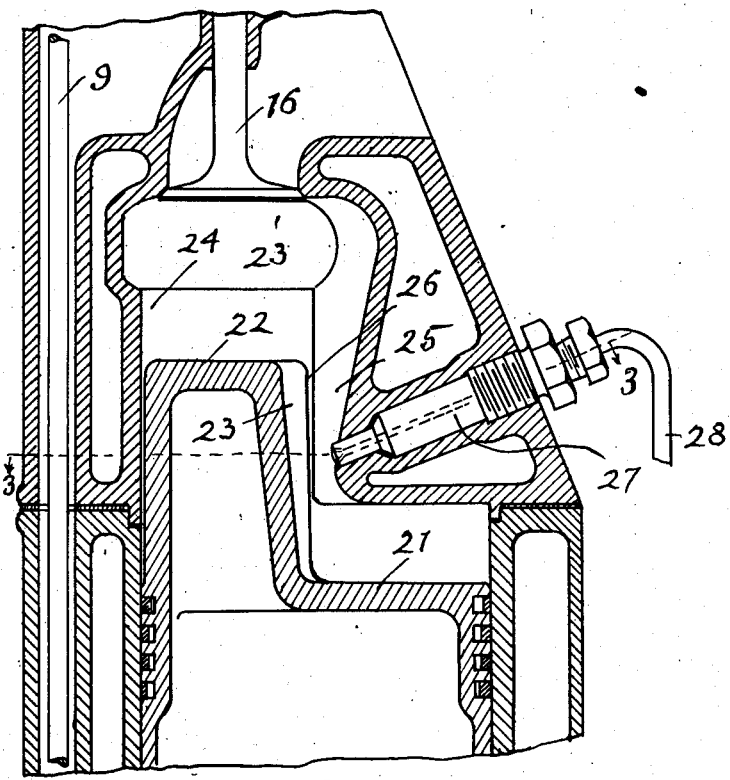
INVENTOR.
Courtney N. Mitchell
BY
ATTORNEYS

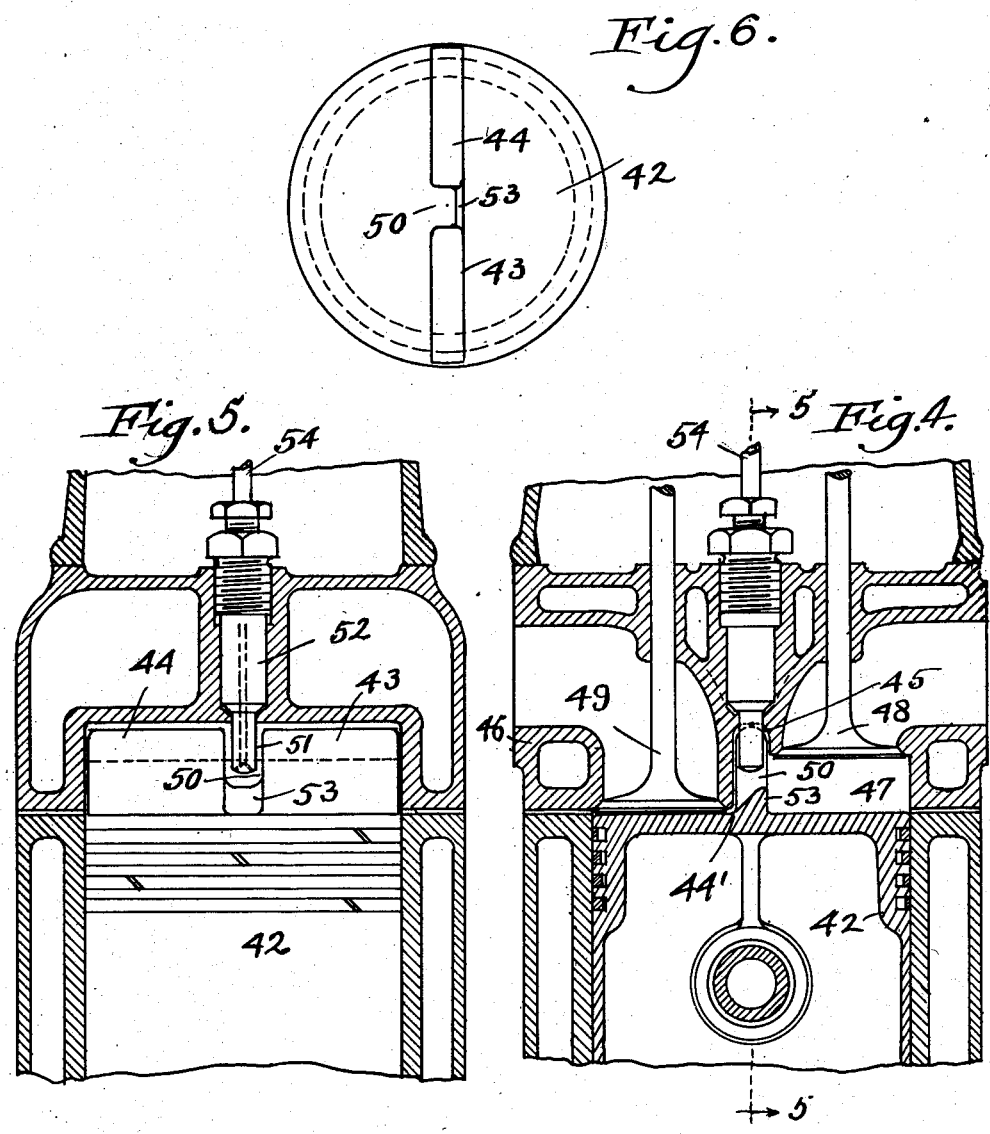

Patented June 28, 1938

2,121,813

UNITED STATES PATENT OFFICE

2,121,813

INTERNAL COMBUSTION ENGINE

Courtney N. Mitchell, Berea, Ohio

Application April 30, 1928, Serial No. 274,133
Renewed December 2, 1932

11 Claims. (Cl. 123—32)

This invention relates to an internal combustion engine and more particularly to an engine of the type in which the fuel is ignited by the heat of adiabatic compression of the air supplied to the working cylinder. In internal combustion engines that utilize the heat of adiabatic compression of the air supplied to the working cylinder to ignite the fuel, it is necessary for the obtainance of efficient operation that all of the fuel injected into the cylinder intimately contacts with sufficient air to effect complete combustion without having an excess of unused air after the combustion has been completed.

It is well known that when a finely divided spray of liquid of relatively light specific gravity is injected into an atmosphere of air compressed to twenty-five or thirty atmospheres, such air assumes the qualities of an elastic cushion so that the penetration of the liquid therein is relatively slight. To overcome this cushioning effect of the compressed air and to obtain the mixing of the fuel therewith, it is necessary to provide a turbulence by a circulation of air set up during the air intake stroke of the piston and preferably continuing through the period of the compression stroke, or the required turbulence can be occasioned by the disturbance set up by the initial combustion of such parts of the fuel as may be provided with sufficient air. However, as neither of these arrangements is obtainable in the period of time available during high-speed operation other methods must be used and the most satisfactory method so far followed has been to introduce into the combustion chamber a relatively large quantity of air compressed to a pressure much above that of the compressed air within the chamber, the required amount of fuel being introduced into the cylinder along with this highly compressed air. The air thus introduced not only produces turbulence but as it has a volume representing an appreciable percentage of that already in the cylinder it penetrates the original volume of air and complete combustion without an excess of air results. However, it is disadvantageous to provide an engine with an air injection mechanism since the same is costly, besides being heavy and cumbersome because of the separate air compressor which must be built and driven from the engine to which it supplies air. In addition, such a compressor takes up considerable space, absorbs power, and is frequently difficult to balance for high-speed operation. Because of the fact that the portion of the engine stroke during which injection can take place, is of short duration, the volume of air and fuel which must be injected in the air injection type of engine materially limits the speed thereof.

Accordingly, the principal object of the present invention is to provide, in an engine of the type above set forth, a means for securing thorough mixing of air and fuel without resorting to the expedient of injecting additional air, separately compressed to a pressure above that of the air in the cylinder.

It is also a well-known fact that there are practically no limitations to the speed at which a carburetor type of engine may operate insofar as the fuel and air mixture is concerned and that with a given cylinder volume the power output is almost proportional to the speed so that a good speed range is necessary for a large power output.

Hence, another object of the invention is to provide an engine of the type first above set forth, capable of attaining the speed of operation of the carburetor type of engine combined with the complete combustion of the air injection type of engine.

A still further object is to provide an internal combustion engine that requires very few auxiliary parts, is easily manufactured, is light, and may be easily balanced for smooth operation over a wide range of speeds.

In addition to the foregoing objects, a still further object is to provide an engine that will give a large power output without excessive peak explosion pressures and which will thus conserve the bearings and other working parts upon which excessive loads would fall if excessive pressures were developed.

In attaining these objects with their resultant advantages, the invention contemplates an engine construction wherein a material portion of the compression air itself within the working cylinder serves the purpose of the injected air of the air injection type of engine, and thereby provides for turbulence and for penetration; and at the same time to employ a means of securing a more or less uniform mixture of air and fuel wherein the fine drops of the fuel are pulverized into a finely divided mist comparable with the fuel and air mixture produced in an efficient carburetor, the entire action above set forth taking place, however, within the working cylinder.

Several embodiments of the invention are illustrated in the accompanying drawings wherein;

Fig. 2 is an enlarged fragmentary section showing the piston and combustion chamber illustrated in Fig. 1;

Fig. 3 is a transverse section taken approximately on line 3—3 of Fig. 2;

Fig. 4 illustrates still another form of engine constructed in accordance with the invention wherein the combustion chamber is so arranged that the injection device may be located vertically directly above the piston;

Fig. 5 is a section taken approximately on line 5—5 of Fig. 4; and

Fig. 6 is a top plan of the piston shown in Figs. 4 and 5.

Figure 1:
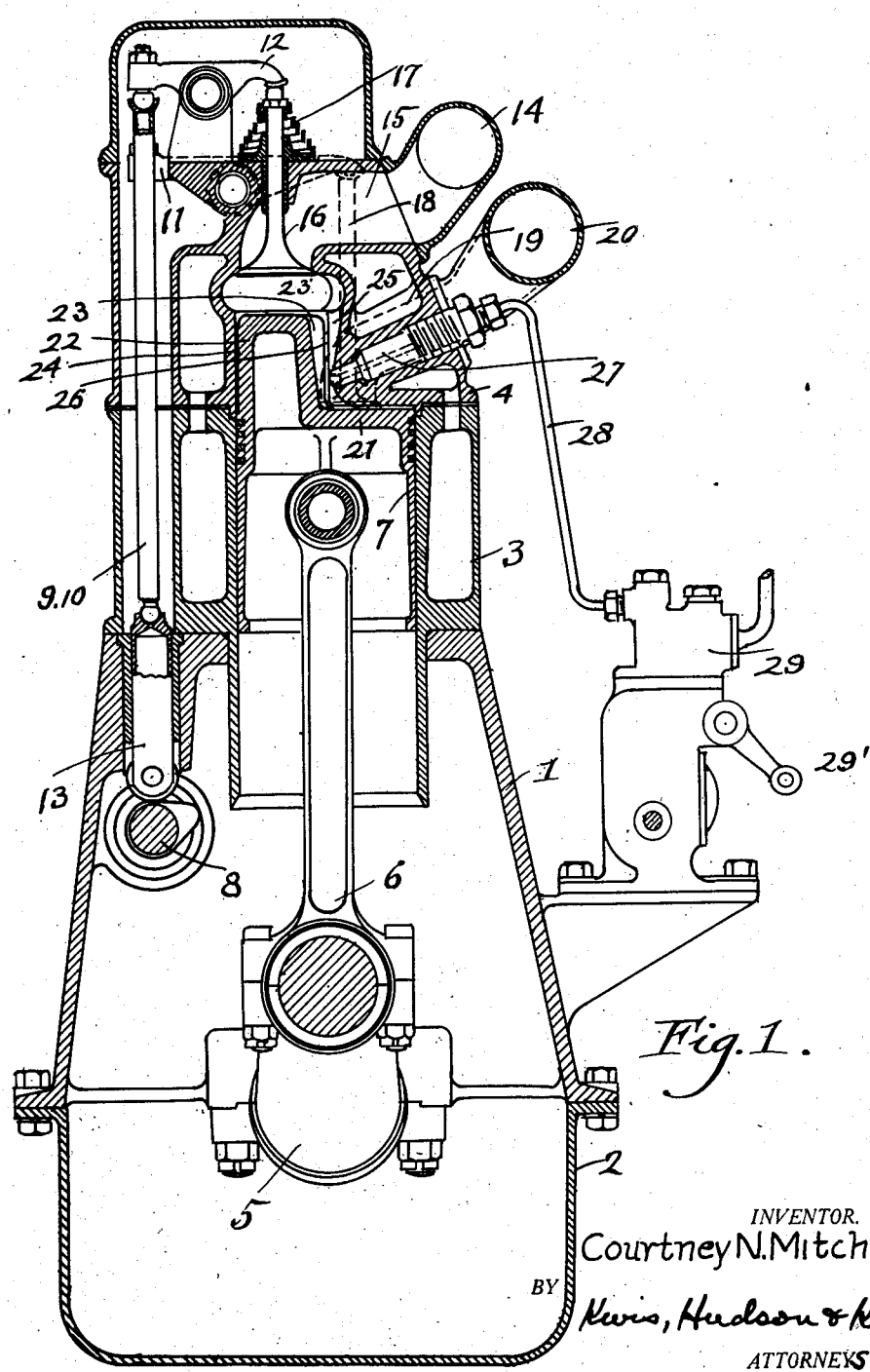
Fig. 1 is a transverse section through the cylinder and injection device of an engine according to one form which the invention may follow.

In the form illustrated in Figs. 1, 2 and 3, the engine construction is substantially standard with the exception of the piston, combustion chamber, and fuel injector and, therefore, the parts of such engine which do not directly relate to the invention will be described briefly.

As is usual in engines of this type, the crankcase 1 is provided at its underside with the engine pan 2 and at its upper side with the cylinder block 3 upon which is arranged the cylinder head casting 4. The crankshaft 5 is mounted in suitable bearings in the crankcase 1 and is connected by the connecting rod 6 to a specially constructed piston 7. The usual cam shaft 8 is arranged in the crankcase, which shaft may be driven from the crankshaft in a number of ways, as, for example, by the gear train usually found in engines of this type. The cam shaft 8 actuates the usual push rods 9 and 10 through tappets 13 interposed between the cams and the push rods, which rods, in turn, actuate the rocker arms 11 and 12.

An air supply pipe 14 communicates with port 15 and the valve 16, the latter being held on its seat normally by a spring 17. The intake valve 16 is actuated against the tension of the spring 17 by the rocker arm 12, while a valve 18 operated by the rocker arm 11 forms an exhaust valve providing for the escape and expulsion of gases from the working cylinder through port 19 and exhaust pipe 20. The piston 7, of course, is provided with the usual sealing rings, not numbered, a piston pin mounting and a shirt or trunk. The head 21 of the piston has internally formed thereon a hollow boss or knob 22, the general form of which is in the nature of an inverted cup. This knob is provided with a substantially semi-circular groove 23 extending longitudinally of the knob and preferably arranged on the side thereof nearest the axis of the piston, the groove 23 being of tapered or diverging form, the widest part of which is adjacent the upper end thereof. The cylinder head 4 is provided with a cylindrical space 24 within which the knob 22 is received, such space 24 being provided in its side with a groove 25 corresponding to the groove 24 so that when the piston 7 is in its highest position the two grooves, namely, 23 and 25, will form a substantially cylindrical or conical throat 26, as clearly illustrated in Fig. 3.

The injection nozzle 27 is arranged in the cylinder head 4 in such a manner that its outlet or discharging end protrudes slightly into the narrowest part of the throat 26. This nozzle may be in either a horizontal position or at a small angle to the horizontal. The nozzle is provided with fuel delivered thereto through a conduit tube 28 connected with the fuel pump 29, such pump delivering the fuel under suitable impulses of pressure to correspond with the requirements of the operation of the engine cycle. It is preferable to provide the engine with two exhaust ports for the cylinder, such ports being indicated in Fig. 3 at 19 and 19' together with the corresponding valves 18 and 18' which are operated by the push rods 9 and 9'.

From the detailed description thus far set forth, it is clear that upon the downward stroke of piston 7 and upon the opening of valve 16 during this downward stroke, a full charge of air will be taken into the cylinder through the port 15, while on the upward stroke of the piston the valve 16 closes so that as the piston approaches its upper position the air taken in during the downward stroke is compressed. When the piston has reached the point in its upward stroke where the top of the knob enters the recess 24 in the head, it is clear that only a small portion of the total air contained in the cylinder is located directly over the knob 22, while the greater portion of the air is confined in the space over the piston head 21. Thus as the piston approaches the top of its upward stroke approximately all of the air confined in the space over the piston head 21 is forced into the space between the piston head and the cylinder head 4, and, thererefore, has to pass into the throat 26 through the restricted or smaller portion thereof at a very high velocity. Since the injection of fuel from nozzle 27 is timed to occur during this transfer of the air into the throat 26, a vigorous atomizing action takes place at the nozzle end and the fuel in a very finely divided form is mixed with the inrushing air and projected with high velocity into the air contained in space 23' just below the valve 16 and above the knob 22 and thereby forms almost instantly a homogeneous combustible mixture.

As the adiabatic heat of compression has raised the temperature to the ignition point, the explosion or rapid burning takes place and by the time the piston reaches the top of its stroke a reverse flow of the burning mixture occurs through the throat 26 so that the last particles of fuel leaving the nozzle 27 are thrown outwardly into the small amount of air remaining in the space directly over the piston head 21. By this means the fuel is mixed thoroughly with all the air and complete combustion takes place without any excess of air. It is obvious that this atomizing action will take place with very little change in its efficiency at high engine speeds inasmuch as there is a corresponding increase in the velocity of the air and in the speed of the injecting fuel stream. Provision is made for varying the time of injection and the amount of fuel thus injected so that by moving the lever 29' of the fuel pump 29 a relatively wide range of speed is obtainable in the operation of this engine. When the piston 7 reaches the lower end of its expansion or working stroke, exhaust valves 18 and 18' open and the exhaust gas is expelled by the upward movement of the piston. By the time knob 22 enters recess 24 the pressure in the cylinder has dropped nearly to atmosphere and the small amount of gas remaining in the recess is expelled by knob 22 through the throat 26 to the exhaust valves.

In the form shown in Figs. 4, 5 and 6, the piston 42 is provided on its head with a pair of vertical tongues or projections 43 and 44 which enter a groove 45 provided in the cylinder head 46. The head 46 is also provided with a recess 47 directly under the air intake valve 48, the space between the head 46 and the valve 48 forming the larger portion of the clearance or compression chamber. An exhaust valve 49 is located in the lower face of the head 46, there being very little clearance between such valve and the piston head when the piston is at the top of its stroke. Arranged between the projections 43 and 44 of the piston head is a space 50 of such width that it will just clear the end 51 of an injection nozzle 52 which projects into the cylinder. The bottom of this space or notch is formed with a bevelled upwardly extending ledge 53 for deflecting the air in the direction of the nozzle end. Fuel is delivered to the nozzle 53 through the tube 54 by a suitable fuel pump and at properly timed impulses, as explained in Figs. 1, 2 and 3.

The results obtained in the operation of the construction shown in Figs. 4, 5 and 6 are almost identical with those obtained in the construction shown in Figs. 1, 2 and 3. When the piston 42 approaches its top position the projections 43 and 44 start to pass the edge 44' of the recess provided in the cylinder head whereby a substantial portion of the air enclosed in the cylinder is trapped into this space. As the piston continues to rise, this air is rapidly compressed and practically all of it is forced through notch 50, past the end 51 of the nozzle at the time of fuel injection and the fuel is picked up by this highly compressed air and forced into the space 47 in a finely divided and uniformly distributed state. The projecting ledge 53 deflects this air upwardly toward the nozzle, especially at the end of the piston stroke, thus insuring complete atomization of the last particles of fuel.

In the construction above described it should be noted that atomization takes place not only from the action of the air but also because of the location of the nozzle in relation to the knob or equivalent element of the piston. The air being at a high temperature at the time the fuel is projected against it causes additional atomizing and, in fact, some vaporization. As shown in Figs. 1, 2 and 3 the fuel is projected against a surface which is not only hot but is also moving continuously into new positions as the injection continues so that the maximum amount of temperature is available. Of course the form of groove 23 in the knob 22 may be changed, as desired, so that the velocity of the air past the nozzle 27 can be maintained at any desired amount for any arbitrary position of the piston. It is thus possible by changing the form of the groove, to compensate for the slowing of the piston as it approaches the top of its stroke. This condition is also true, to a certain extent, in connection with the form shown in Figs. 4, 5 and 6, in that the clear opening of notch 50 becomes smaller and smaller as the piston approaches its upper dead center.

Although several preferred embodiments of the invention have been illustrated and described, it should be understood that the invention is not to be limited thereto but that it is susceptible of various other modifications and adaptations within the scope of the following claims.

Having thus described my invention, what I claim is:

1. In an internal combustion engine of the type described, a cylinder and a piston having a projection and a recess arranged to cooperate and interfit with a working clearance during the compression stroke of the piston and forming two compression chambers of differing size at the head of the cylinder, one of said cooperating parts having a cut-out portion forming, when the parts are in cooperating relationship, a localized enlarged passageway connecting said compression chambers, and a fuel injector arranged so that its nozzle is located intermediate the ends of said passageway and substantially at its narrowest point at the completion of the compression stroke.

2. In an internal combustion engine of the type described, a cylinder and a piston having a projection and a recess disposed eccentrically with respect to the cylinder and piston and arranged to cooperate and to interfit with a working clearance during the latter part of the compression stroke of the piston and form two compression chambers of differing size at the head of the cylinder, one of said cooperating parts having a cut-out portion of variable depth and forming, when the parts are in cooperating relationship, a localized and enlarged passageway of variable cross-section connecting said compression chambers, and a fuel injector arranged so that its nozzle is located intermediate the ends of said passageway and substantially at its narrowest point.

3. In an internal combustion engine of the type described, a cylinder and a piston having a projection and a recess cooperating with each other and interfitting with a working clearance during the compression stroke of the piston and forming two compression chambers of differing size at the head of the cylinder, said projection and recess each having a groove of variable depth extending longitudinally thereof and cooperating to form, when the parts are interfitting, a localized enlarged passageway connecting the said compression chambers and a fuel injector arranged so that its nozzle is located intermediate the ends of said passageway and substantially at its narrowest point at the completion of the compression stroke.

4. In an internal combustion engine of the type described, a cylinder and a piston having a diametrically extending recess and a diametrically extending projection arranged to cooperate with each other and to interfit with a working clearance during the compression stroke of the piston and forming two compression chambers of differing size at the head of the cylinder, one of said cooperating parts having a cut-out portion forming when the parts are in cooperating relationship, a localized enlarged passageway connecting said compression chambers, and a fuel injector arranged to discharge fuel into said passageway intermediate its ends at the completion of the compression stroke.

5. In an internal combustion engine of the type described, a cylinder and a piston having a projection and recess cooperating and interfitting with a working clearance during the compression stroke of the piston and forming two compression chambers of differing size at the head of the cylinder, one of said cooperating parts having a cut-out portion of variable depth and forming, when the parts are in cooperating relationship, a localized enlarged passageway constituting a variable venturi connecting the compression chambers, and a fuel injector arranged to discharge fuel into said venturi and substantially at its narrowest point.

6. In an internal combustion engine of the type described, a cylinder structure, a piston in said cylinder structure, said cylinder structure and said piston having parts adapted to cooperate to define two combustion chambers of differing size at the head of the cylinder structure, a portion of one of said parts extending between said combustion chambers and having a cut-out section to provide, when the parts are in cooperating relationship, an enlarged localized passage connecting said combustion chambers, said passage having the form of a venturi, and a fuel injector arranged to discharge into said venturi substantially at its narrowest point.

7. In an internal combustion engine of the type described, a cylinder, a piston in said cylinder, a cylinder head, said cylinder, said piston and said cylinder head having parts adapted to cooperate to define two combustion chambers of differing size, a portion of one of said parts extending between said combustion chambers and having a cut-out section to provide, when the parts are in cooperating relationship, an enlarged localized passage connecting said combustion chambers, said passage having a restricted portion, and a fuel injector arranged with its nozzle substantially at the point of greatest restriction.

8. In an internal combustion engine of the type described, a cylinder structure, comprising two separate parts assembled together, a piston cooperating with said cylinder structure and providing therein two combustion chambers of differing size, one of the separate parts of the cylinder structure having a portion extending from one combustion chamber toward the other combustion chamber, a part of said portion cut away to form an enlarged localized passage connecting said combustion chambers, said passage varying in cross sectional area along its axis, and an injector adapted to discharge into said passage substantially at its point of least cross sectional area.

9. In an internal combustion engine of the type described, a cylinder structure comprising two separate parts assembled together, a piston cooperating with said cylinder structure and forming therewith two combustion chambers of differing size, one of the separate parts of the cylinder structure having a portion extending from one combustion chamber toward the other combustion chamber, a part of the surface of said portion cut away to form an enlarged localized passage connecting said combustion chambers, said passage varying in cross sectional area along its axis, an injector adapted to discharge into said passage substantially at its point of least cross sectional area, and the axis of said injector substantially at right angles to the axis of said passage.

10. In an internal combustion engine of the type described, a cylinder, a cylinder head and a piston comprising the elements defining two combustion chambers, one of said elements having a groove serving as a localized restricted passage extending between the combustion chambers, the axis of said passage being substantially at right angles to the axis of said piston, and an injector adapted to discharge into said passage, the axis of said injector being substantially at right angles to the axis of the passage.

11. In an internal combustion engine of the type described, a cylinder, a cylinder head and a piston comprising the elements defining two combustion chambers, one of said elements having a groove serving as a localized restricted passage of varying cross sectional area, said passage extending between the combustion chambers, the axis of said passage being substantially at right angles to the axis of said piston, and an injector adapted to discharge into said passage, the axis of said injector being substantially at right angles to the axis of the passage.

COURTNEY N. MITCHELL.